US000001201H

United States Statutory Invention Registration [19]

[11] Reg. Number: H1201

Sakuma

[43] Published: Jun. 1, 1993

[54] DIRECT RADIOGRAPHY SYSTEM

[75] Inventor: Haruhiko Sakuma, Hachioji, Japan

[73] Assignee: Konica Corporation, Tokyo, Japan

[21] Appl. No.: 560,176

[22] Filed: Jul. 31, 1990

[30] Foreign Application Priority Data

Aug. 12, 1989 [JP] Japan ..... 1-208188

[51] Int. Cl.[5] ..... G03B 42/04
[52] U.S. Cl. ..... 378/182; 378/185
[58] Field of Search ..... 378/182, 185, 186, 187, 378/188, 205

[56] References Cited

U.S. PATENT DOCUMENTS 2,103,961 12/1937 Wilmanns ..... 378/188
3,846,635 11/1974 Shaffer ..... 378/186

*Primary Examiner*—Bernarr E. Gregory

*Attorney, Agent, or Firm*—Finnegan, Henderson, Farabow, Garrett & Dunner

[57] ABSTRACT

In an X-ray apparatus which photographs a radiogram on a film in a cassette, a local film portion in a peripheral of the film has a local film contour that is distinct from other portions of the film, and a local cassette portion in a peripheral of the cassette has a local cassette contour that is distinct from other portions of the cassette. When the film is set in the cassette, the local film portion is superimposed on the local cassette portion.

2 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DIRECT RADIOGRAPHY SYSTEM

BACKGROUND OF THE INVENTION

The present invention relates to a direct radiography system in which subjective sharpness of an image can be improved by using silver halide photosensitive materials for one-sided direct radiography use and film charging mistakes can be avoided.

Two sided films in which silver halide emulsion layers are coated on both sides of a support, have been conventionally used for direct radiography.

In using two-sided films, high sensitivity and high image density can be obtained. On the other hand, two sided-films are theoretically and actually inferior to one-sided films in terms of image sharpness obtained after development because sharpness of a two-sided film deteriorates when the angle of incidence is not right-angled and because of the cross over effect.

Recently, one-sided films have been used for direct radiography of breasts and ear bones and for tomography in order to obtain images of better image sharpness.

One-sided film consists of a layer of photosensitive silver halide emulsion coated only on one side of a support. Accordingly, an intensifying screen for X-ray use is used only on one side.

For that reason, when film is put into a cassette in a dark room, the photosensitive material surface of the film must properly come into contact with the intensifying screen surface. Each manufacturer of film provides a notch in a specific position of the film in order to determine easily whether the photosensitive material surface is the front side or the rear side of the film.

However, the shapes and positions of film notchs are not standard and are different depending on the kind of film and the manufacturer. Consequently, when the film is charged into a cassette in a dark room, film charging mistake tends to occur.

The object of the present invention, therefore is to provide a one-sided direct radiography system which is characterized in that film can be charged easily into a cassette in a dark room and film charging mistakes caused by the misjudgment of the film side, can be avoided.

Other objects will become apparent from the following description of the invention.

SUMMARY OF THE INVENTION

The object described above can be attained by a one-sided direct.

The object has been attained by a one-sided direct radiography system in which silver halide photosensitive film made in such a manner that at least one layer of silver halide emulsion is provided to one side of a support, is used, and in which a cassette into which the photosensitive film is charged, is used, and which is characterized in that: the photosensitive film and the cassette have a cut-out portion of the same shape.

Figure 1:
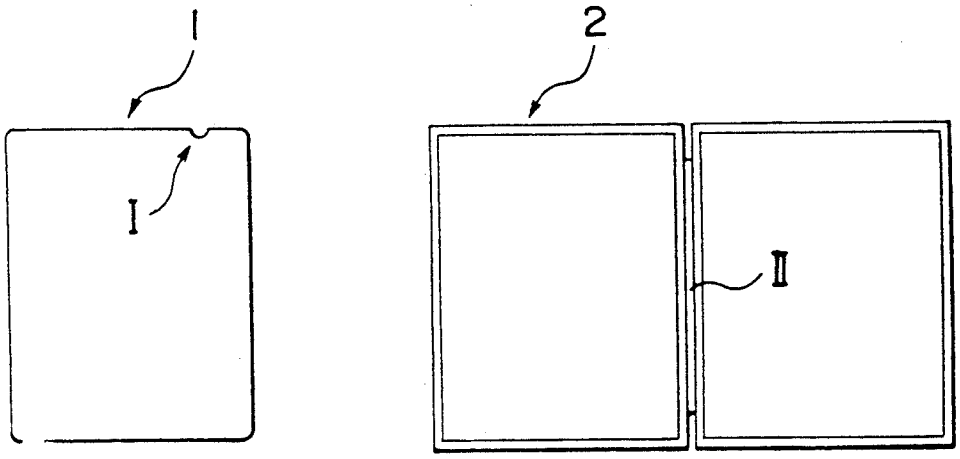
FIG. 1 illustrates a plan view of film of 10×12 inch size which has been conventionally used and a plan view of a cassette for the film described above.

In the drawings, I is a notch of the film and I′ is a portion of the cassette which corresponds to the notch I of the film, wherein the shape of the portion I′ is actually the same as that of the portion I of the film. In the drawings, II is a hinge of the cassette.

DETAILED DESCRIPTION OF THE INVENTION

The following are the detailed explanations of the present invention.

The cassette described in the present invention is defined as the cassette which is used for ordinary radiography and which is a container for use with film, wherein the cassette is made from aluminum, carbon or lead.

The cut-out portions of the cassette and the photosensitive film, the shapes of which are actually the same, which is referred to in the specification of the present invention, can be described as follows: a prescribed portion of the photosensitive film is notched in such a manner that the notch does not affect the photographed image; and the same shape of notch is formed in the cassette so that the notch of the cassette is matched with the notch of the film when the film is charged in the cassette. The shape and position of the cut-out portion are not particularly limited. However, it is preferable that the size of the cut out portion is minimum as far as the object of the present invention can be attained. The cut-out portion of the photosensitive film may be located either on the upper portion or the lower portion and either on the right side or the left side. It is preferable that the cut-out portion be formed into a shape so that the photosensitive film and the cassette can be easily matched, and that the cut-out portion is formed in a position in which the photosensitive film and the cassette can be easily matched.

The conventional cassette to which an attachment with the shape which conforms to the notch of the photosensitive film is provided, may be used.

FIG. 1 illustrates a plan view of the conventional film 1 and a plan view of the conventional cassette 2.

Figure 2:
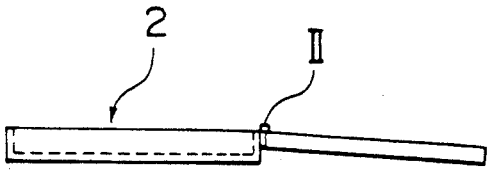
FIG. 2 is a side view of the cassette 1 for use in the film.

FIG. 2 is a side view of the cassette 2 for use in the conventional film.

Figure 3:
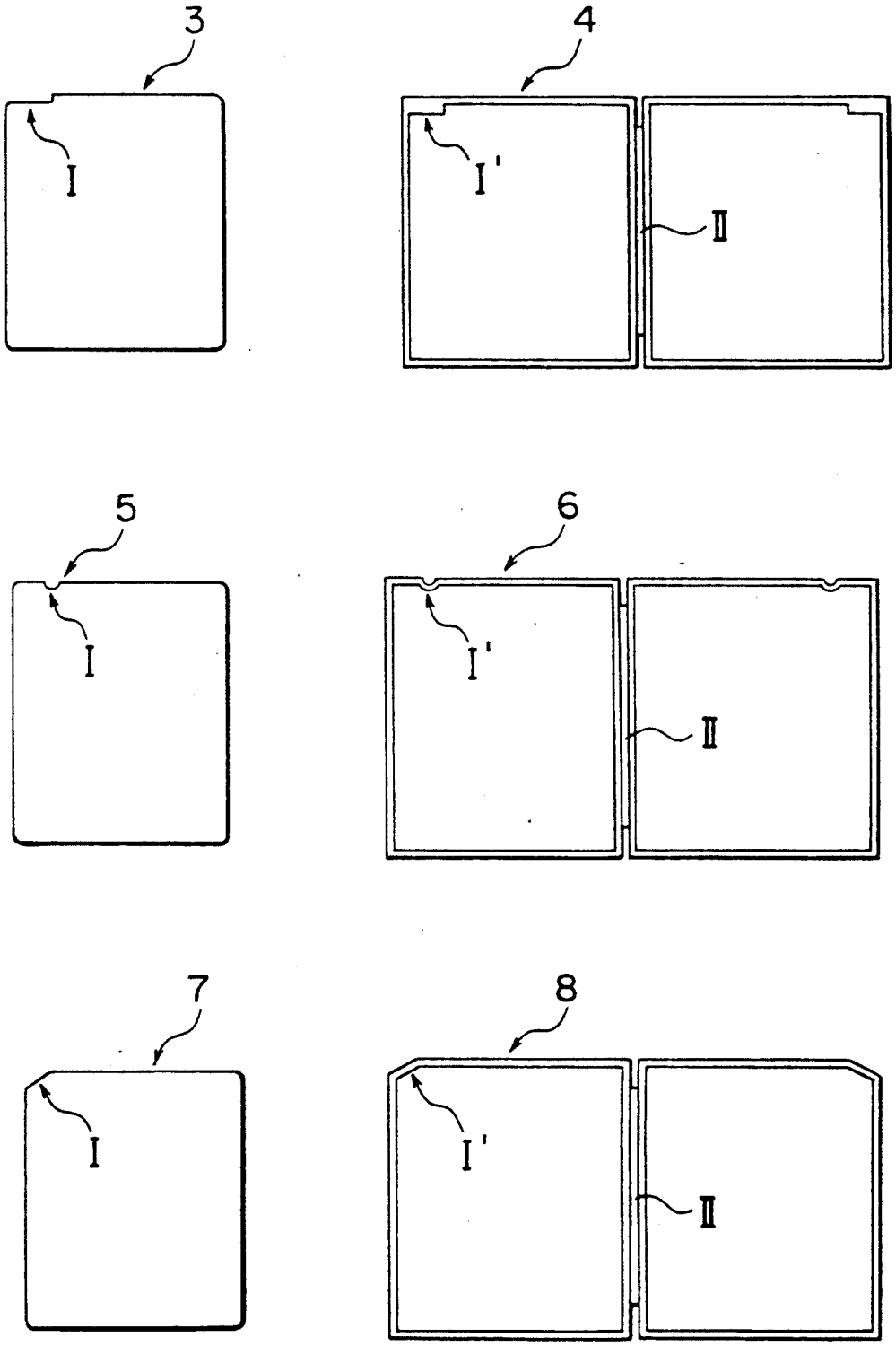
FIG. 3 illustrates plan views of three examples of the film of 10×12 inch size of the present invention and the cassette for use in the film.

FIG. 3 illustrate plan views of the films 3, 5 and 7 for use in the one-sided direct radiography system of the present invention and plan views of the cassettes 4, 6 and 8 for use in the film, wherein three examples are illustrated in the drawing.

A step-shaped notch is provided to the left edge of the film 3 on the surface of which emulsion is coated, and cassette 4 is used in the film, wherein the shape of the cassette is actually the same as that of the film.

A semicircular notch is provided to the left edge of film 5 and a notch of the same shape is provided in cassette 6 for use in the film. A triangle-shaped notch is provided to the left edge of film 7, and a notch of the same shape is provided in cassette 8 for use in the film.

A mark which absorbs X-rays is conventionally attached to a cassette so that the right side and the left side of the film in photographing can be judged when the developed image is read. According to the radiography system of the present invention, there is no need to attach such a mark on the cassette because the film photographing position easily can be judged by the notch provided on the film. Different from the conventional cassette, the position of the cut-out portion of a film can be judged from the external appearance of a cassette, so that the cut-out portion of the cassette is very useful not only for eliminating charging mistake of a film but also for preventing misjudgment in photographing and in reading the developed image.

The cassette which is the same as the conventional cassette in terms of material and structure, may be used as the cassette of the present invention. It is preferable to use the cassette in which a film support frame is provided, wherein the shape of the frame matches the cut-out portion of the film. It is further preferable in order to attain the object of the present invention that the cassette including the external frame conforms to the shape of the cut-out portion of the film. For example, the cut-out portion of cassette 6 and cassette 8 illustrated in FIG. 3 is provided not only to the inside of the cassette but also to the outside of the cassette so that the cut-out portion can be distinguished from the outside.

However, the shape of the cut-out portion is not necessarily formed outside the cassette. Depending on circumstances, markings such as a label and the like may be provided to the outside of the cassette so that the inside position of the cut-out portion can be distinguished from the outside of the cassette.

The present invention can be applied to check whether it is a front side or a reverse side, wherein the film can be not only a photosensitive film, one side of which is coated with photosensitive emulsion, but also a photosensitive film, both sides of which are coated with photosensitive emulsion, wherein the characteristic of the emulsion on one side and that on the other side are different.

Silver iodobromide, silver iodochloride and silver iodochloro bromide may be used as the silver halide photosensitive material of the one-sided direct radiography of the present invention. Silver iodobromide is preferable as high sensitivity can be obtained.

The silver halide particle in the photosensitive emulsion can be: an isotropic crystal such as a cube, an octahedron and a decatetrahedron; a multi-plane crystal such as a sphere; a twin with surface defects; or the mixture or the compound of them. The particle of the silver halide may be a fine particle, the size of which can be in the wide range from not more than 0.182 to 20μm.

The emulsion used in the silver halide photosensitive material can be manufactured by a publicly known method. For example, it can be manufactured by the method disclosed in Emulsion Preparation and types on Page 22 to 23 of No. 17643 (December 1978) of Research and Disclosure (RD), and the method disclosed on Page 648 of No. 18716 (November 1979) of Research and Disclosure (RD).

The emulsion of the silver halide photosensitive material can be manufactured by the method disclosed by "The theory of the photographic process", the fourth issue, Page 38 to 104, by T. H. James, published by Macmillan Co. (1977), "Photographic emulsion Chemistry", by G. F. Dauffin, published by Focal press Co. (1966), "Chimie et physique photograhique", by P. Glafkides, published by Paul Montel (1967), "Making and coating photographic emulsion" by V. L. Zelikman et al., published by Focal press Co. (1964), and the like.

The emulsion of silver halide photosensitive material can be manufactured by the solution conditions such as the neutral process, the acid process, and the ammonia process; the mixing conditions such as the normal precipitation process, the reversed precipitation process, the double jet process, and the controlled double jet process; the particle preparation conditions such as the conversion process, the core/shell process; and the combination process of these processes.

One example of the emulsion is a monodispersing emulsion in which silver iodide is dispersed inside the particle. The monodispersing emulsion is defined in this specification as silver halide particles which is characterized that when the average particle size is measured by an ordinary method, at least 95% of the particles in terms of the number of the particles, or the weight are within ±40% of the average particle size, and preferably ±30% of the average particle size. Concerning the particle size distribution of silver halide, either the monodispersing emulsion with narrow particle size distribution or the polydispersing emulsion with wide particle size distribution, can be applied.

Concerning the crystal structure of silver halide, the silver halide composition of the inside of the crystal may be different from that of the outside. For example, the emulsion can be a core/shell type monodispersing emulsion which has an apparent double layer structure consisting of a high iodine core portion and a low iodine shell layer.

The silver halide emulsion used in the present invention can be flat-plate-shaped particles, the aspect ratio of which is not less than 5.

The advantages of the flat-plate-shaped particle are the increase in the spectral sensitization efficiency and the improvements in image graininess and sharpness. The emulsion can be prepared by the methods disclosed in the official reports of British Patent No. 2,112,157, U.S. Pat. Nos. 4,439,520, 4,433,048, 4,414,310, and 4,434,226.

The above-described emulsion can be either the surface-latent-image-type in which the latent image is formed on the particle surface, the inside-latent-image-type in which the latent image is formed inside the particle, or the type in which the latent image is formed both on the particle surface and inside the particle. In the stage of physical ageing or the particle preparation, the following compounds can be used: cadmium salt, lead salt, zinc salt, thallium salt, iridium salt or its complex salt, rhodium salt or its complex salt, iron salt or its complex salt, and the like. In the process of physical ageing or chemical ageing, various kinds of photographic addition agents can be added to the emulsion. The publicly known addition agents are compounds which are described in Research Disclosure No. 17643 (December, 1978) and No. 18716 (November, 1979). The kinds of compounds described in the above-mentioned Research Disclosure and the page numbers of the description are shown in the following page.

| NAME OF ADDITION AGENT | RD-17643 Page Classification | RD-18716 Page Classification |
|---|---|---|
| Chemical sensitizer | 23 III | 648 Right upper |
| Spectral sensitizer | 23 IV | 648 Right-649 Left |
| Development accelerator | 29 XXI | 648-Right upper |
| Antifogging agent | 24 VI | 649-Right lower |
| Stabilizer | 24 VI | 649-Right lower |
| Antistaining agent | 25 VII | 650 Left-right |
| Image stabilizer | 25 VII | |
| UV absorber | 25-26 VIII | 649 Right-650 Left |
| Filter dye | 25-26 VIII | 649 Right-650 Left |
| Whitening agent | 24 V | |
| Hardening agent | 26 X | 651 Right |
| Coating aid | 26-27 XI | 650 Right |
| Surface active agent | 26-27 XI | 650 Right |
| Plasticizer | 27 XII | 650 Right |
| Sliding agent | 27 XII | |

-continued

| NAME OF ADDITION AGENT | RD-17643 Page Classification | RD-18716 Page Classification |
|---|---|---|
| Antistatic agent | 27 XII | |
| Matting agent | 28 XVI | 650 Right |
| Binder | 26 IX | 651 Right |

The supports which can be applied to the photosensitive material of the present invention are, for example, the support which is described on the page 28 of the above-mentioned RD-17643 or the support which is described in the left column on the page 647 of RD-18716.

The adequate support is a plastic film, and a surface treatment may be applied to the plastic film such as under coating corona discharge irradiation by ultraviolet rays. After the treatment described above, one side of the support can be coated by the emulsion.

When the present invention is applied to medical radiography, the fluorescent screen is used which is mainly made from fluorescent substance generating near ultraviolet radiation or visual light when it is exposed to the permeable radioactive rays. It is preferable that the fluorescent screens are adhered closely to both sides of the photosensitive material, one side of which is coated by the above-described emulsion.

In this specification, a permeable radioactive ray is defined as a high energy electromagnetic wave such as an X-ray and a $\gamma$-ray.

The fluorescent screen is defined as the intensifying screen which is composed of the fluorescent component mainly made from calcium tungstate or defined as the fluorescent intensifying screen which is mainly composed of the rare earth element compound activated by terbium.

Referring to a concrete example, the present invention will be described in more detail. However, it should be understood that the invention is not limited by the specific embodiment.

EXAMPLE 1

The silver halide photosensitive material was made in such a manner that a high sensitive silver iodobromide emulsion layer containing 2 mol % of silver iodide for direct radiography use and a protective layer were coated on one side of a polyethylene terephthalate film support on which an under coat treatment was conducted and the thickness of which was 175 $\mu$m.

Films of 10×12 inch size (25.4 cm by 30.5 cm) were made from the obtained films. The left edges of the obtained films were cut as illustrated in FIG. 3; numerals 3, 5 and 7 show the films. The obtained films were used as the one-sided direct radiography film of the present invention. The cassettes for use in those films were made; the cassettes are illustrated in FIG. 3 and numerals 4, 6 and 8 show the cassettes reciprocal to the films. The film 1 and the cassette 2 illustrated in FIG. 1 were also made as a comparison. Four kinds of films obtained in the way described above were processed. The films were charged to the cassettes, wherein the intensifying screens were applied to the films. Then, the films were exposed to X-rays through an aluminum wedge under the conditions that the potential of the X-ray tube was 90 KVP and the electric current was 100 mA; and the films were developed by the automatic developing unit SRX-501 to which the processing solutions XD-SR and XF-SR (made by Konica Co.) were applied.

In the case of the 10×12 inch size films 3, 5 and 7 illustrated in FIG. 3, the shapes of the films were reciprocal to the shapes of the cassettes. For that reason, it was easy to determine, in a dark room the front side and rear sides of a film. Therefore there was no charging mistake.

Furthermore, in the case of the films 5 and 7, the portion (upper and lower, right and left) of the film corresponding to the photographing position, could be clearly seen, so that the film of the invention was effective in preventing a wrong diagnosis.

On the other hand, in the case of the film 1 illustrated in FIG. 1, when the determination of the front and rear sides of a film was neglected, serious problems frequently occurred: the emulsion side was reversed and the developed image could not be read.

What is claimed is:

1. An improved X-ray apparatus of the type which photographs a radiogram on a film in a cassette, the film being composed of a support and at least a layer of a photosensitive silver halide emulsion coated on one surface of the support, wherein the improvements comprise:

a local film portion at a peripheral location of the film which has a local film contour being distinct from other portions of the film; and a local cassette portion at a location in the cassette that corresponds to the peripheral location of the film, which has a local cassette contour being the same as the local film contour in shape and distinct from other portions of the cassette, wherein the local film portion is superimposed on the local cassette portion by the setting of the film in the cassette.

2. The X-ray apparatus of claim 1, wherein the local film portion is a cut-out portion of the film, and the local cassette portion is a cut-out portion of the cassette.

* * * * *